INVENTORS
HENRY T. BAUM
CLAUDE J. STILES

United States Patent Office 3,846,073
Patented Nov. 5, 1974

3,846,073
PROCESS AND APPARATUS FOR MEASURING THE COMPOSITION OF FLUID PLASTICS
Henry T. Baum, Mattoon, and Claude J. Stiles, Tuscola, Ill., assignors to National Distillers and Chemical Corporation, New York, N.Y.
Continuation-in-part of abandoned application Ser. No. 13,256, Feb. 20, 1970. This application Apr. 8, 1971, Ser. No. 132,844
Int. Cl. C08f 15/04; G01n 27/22; G01r 27/26
U.S. Cl. 23—230 A
4 Claims

ABSTRACT OF THE DISCLOSURE

Process for determining the proportion of monomers of a copolymer in a fluid stream of said copolymer.

CROSS REFERENCE

Figure 1:
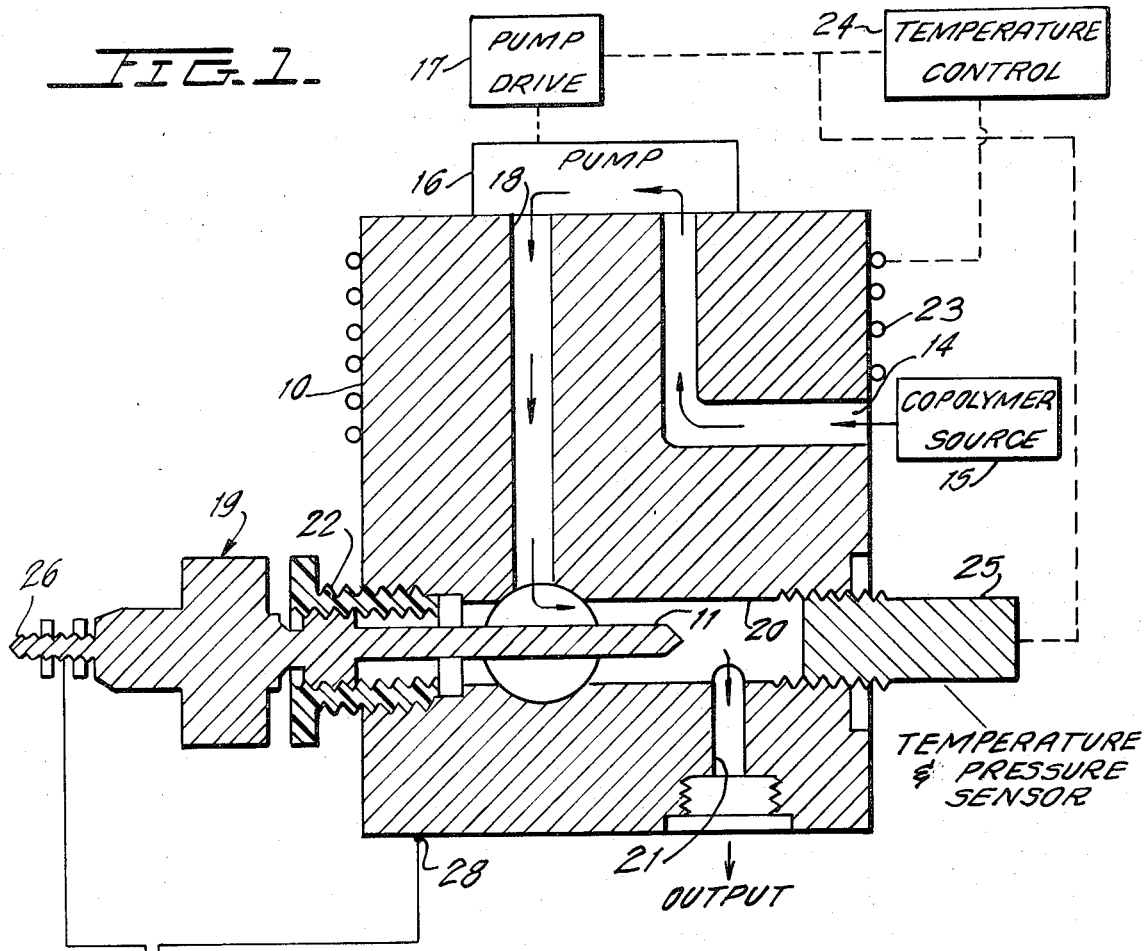

This application is a continuation-in-part of application Ser. No. 13,256, filed Feb. 20, 1970, and now abandoned.

Laboratory data has shown that the dielectric constant of copolymers composed of monomers having different dielectric constants changes with variations in the proportion of the monomers of said copolymer. The present invention envisions, first, that the dielectric constant of the copolymer can be correlated with variations in the proportion of the monomers in the copolymer; second, that a capacitance sensor, which is responsive to the dielectric constant of the copolymer at any internal of time, can be used to provide an indication of its composition (i.e., proportion of monomers) at that time; and third, that capacitance measurements can be correlated with the proportion of the monomers in the copolymer.

The use of capacitance probes in various flow processes is known in the art. For example, U.S. Pat. No. 3,273,058 employs a capacitance probe to measure the moisture content of coal in a conveyor; Pats. 3,067,385, 3,188,565 and 3,238,452 describe the employment of capacitance probes in oil flow pads to measure contamination products; and Pats. 2,540,146, 2,765,441 and 2,820,987 show the use of capacitance measurements for determining the thickness and constituency of solidified plastic coatings on wire. While disclosing the usage of capacitance probes to measure unwanted trace contaminants, none of these patents disclose the use of a capacitance probe in a fluid copolymer stream for the purpose of measuring the composition of said copolymer. Nor do any of these patents disclose the need for placing the probe at a point in the fluid stream where temperature, pressure, and phase or state of the final product remain substantially constant. As will become clear hereinafter, such placement in a fluid copolymer stream can provide a precise analysis of the composition of a copolymer.

While the present invention will be described in an environment for measuring the capacitance of a capactive sensor in contact with polyethylene-vinyl acetate copolymers—and therefore the vinyl acetate content thereof—it will be understood that the invention is not so limited. Thus, it will be noted that included within the scope of the invention are other copolymers wherein the monomers thereof have different dielectric constants. Included are copolymers of olefins and olefinically unsaturated esters and acids such as ethylene-vinyl acetate, ethylene-ethyl acrylate, ethylene-methyl methacrylate, propylene-vinyl acetate, ethylene-acrylic acid, styrene-methyl methacrylate, butene-ethyl acrylate, copolymers and the like.

Materials whose analysis is particularly comprehended within the scope of the invention comprise the copolymers of styrene or lower alkenes—namely, those having from 2–4 carbon atoms (e.g., ethylene, propylene and n-butene) with (1) vinyl esters of lower alkanoic and substituted alkanoic acids—namely, esters of alkanoic acids having from 1–4 carbon atoms (e.g., formic, acetic, chloroacetic, phenyl acetic, propionic and isobutyric acids), (2) $C_3$–$C_4$ alkenoic acids, e.g., acrylic and methacrylic acid, or (3) with alkyl esters of $C_3$–$C_4$ alkenoic acids, e.g., ethyl acrylate, methyl methacrylate, and the like.

The present invention relates to a process for determining the proportion of monomers in a copolymer, the monomers having different dielectric constants, which includes contacting a capacitive sensor responsive to the dielectric constant of fluids with a fluid stream of the copolymer in a zone of relatively constant temperature and pressure, measuring capacitance of the capactive detector while in contact with the fluid stream and comparing the value of the capacitance so measured with a predetermined reference value.

The apparatus for measuring the proportion of monomers in an olefin-olefinic ester or acid copolymer in a fluid plastic composition includes: capacitance measurement means; means for inserting the capacitance measurement means in the composition so that the fluid plastic contacts a length thereof; and means coupled to the capacitance measurement means for providing an output indication therefrom representative of the proportion of monomers in said copolymer.

The present invention further relates to a method for the production of a copolymer composed of monomers having different dielectric constants, the improvement of controlling the proportion of the monomers in the copolymer which includes continuously detecting variations from a predetermined reference value of the capacitance of a fluid stream of the copolymer in a zone of relatively constant temperature and pressure, means for transmitting said variations to controlling means for controlling the proportion of monomer feed in the method, and means in the controlling means for responding to the variations to adjust the proportion of monomer feed such that the capacitance is caused to become closer to the value of the reference value.

Figure 2:
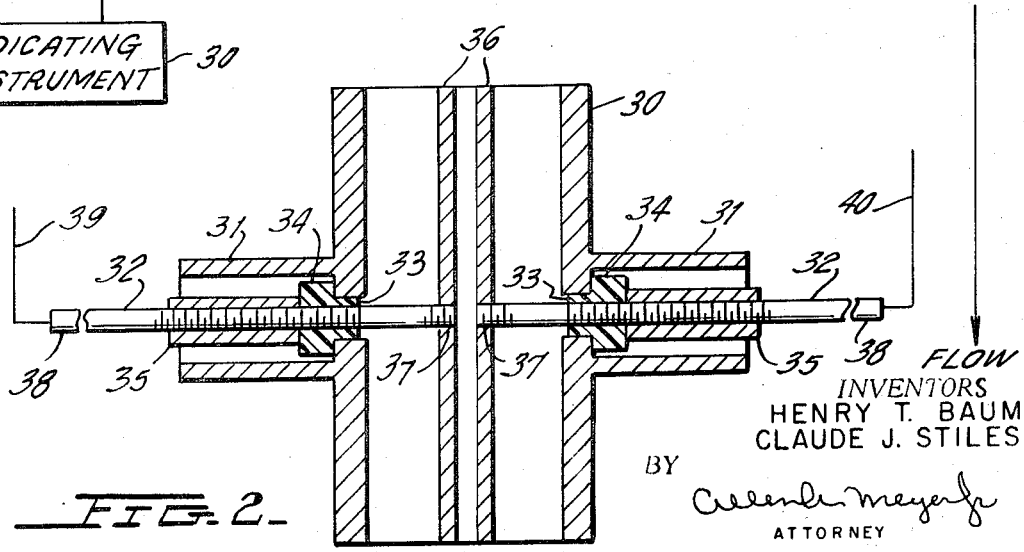

A complete understanding of this invention may be had from the detailed description of apparatus forming specific embodiments thereof, when taken in conjunction with the appended drawings, in which:

FIG. 1 shows apparatus (not necessarily to scale), partly in transsectional view, for measuring the composition of copolymer fluids constructed in accordance with one embodiment of the invention; and FIG. 2 shows apparatus (not necessarily to scale), partly in transsectional view, for measuring the composition of copolymer fluids constructed in accordance with another embodiment of the invention.

Referring now to FIG. 1, there is shown a capacitance probe cell housing assembly 10 and a capacitive meter 12 of known construction having a linear flow scale. The housing 10 may comprise the continuous grader unit normally employed in the processing of polyethylene-vinyl acetate copolymers. Clearly, however, the capacitance measurement can be made at any desired point in the process where temperature, pressure and the state of the final product remain substantially constant. Housing 10 includes a channel 14 at which point the fluid plastic enters the housing from a source 15 of copolymer material. Channel 14 leads to a suitable pump 16 driven by a pump drive 17, which may be an electric motor, so that the plastic material is forced into channel 18 of body 10 at a controlled pressure. Preferably, the pressure at channel 18 is kept between 100 to 300 p.s.i., by appropriate control of the speed of drive 17, or of a gear ratio of gears (not shown) connecting drive 17 to pump 16, or in any other desired manner. The fluid plastic then flows along the length of probe end 11 of capacitance probe 19 in channel 20, and then to an output channel 21 and into a next portion of the process.

Capacitance probe 19 is formed of stainless steel (which can be lightly coated with poly(tetrafluoroethylene) in order to prevent possible adherence of the copolymer to the probe—this can be a problem in ethylene-vinyl acetate copolymers containing 35 percent or more vinyl acetate), and is secured to housing 10 by an insulation bushing 22 which insulates probe 19 from housing 10.

A suitable heater such as heater winding 23 is connected to body 10. Obviously, any desired heater could be used. Winding 23 is connected to a suitable temperature control means 24 which controls the power applied to heater 23. A temperature and pressure sensor 25 is then connected in channel 20, and the output thereof controls the pump drive 17 and temperature control 24 to maintain constant temperature and pressure conditions within any desired limits. Note that any suitable control system could be used for the temperature control and an independent system could be used for the pressure control if pressure and temperature control are not inherent in the portion of the process selected for making the capacitance measurement.

The electrode end portion 26 of the probe 19 is shown connected to one input of a length of shielded or coaxial cable 27 connecting the capacitance meter 12 to the probe unit 19. The other input of the shielded or coaxial cable is shown connected to housing 10 at connecting point 28. An indicating or recording instrument 30 is shown coupled to the meter 12 to convert its capacitance readings into percentages of monomer in the copolymer and to provide readouts thereof. A capacitance dynalog, manufactured by the Foxboro Company of Foxboro, Mass., may, if desired, be substituted for the units 12 and 30 to measure, indicate and transmit the readout to a recorder or to process control means.

In the apparatus according to this embodiment of the invention, the capacitive meter 12 provides a reading which is a linear function of the capacitance of the probe 19 to the housing 10, which is metallic. This reading similarly can be correlated to the dielectric constant of the fluid polymeric material to provide an indication of the proportion of monomers in the polymeric material as well as being directly correlated to the proportion of the monomers in the polymeric material flowing along the length of the probe. Since changes in the vinyl acetate content of polyethylene-vinyl acetate copolymers produce corresponding changes in the capacitance the use of the capacitance probe 19 is an effective means by which changes in the composition of the fluid plastic can be detected. More importantly, the capacitance probe 19 provides a means by which the direction and extent of changes in such composition can be easily and continuously monitored. In one such analysis of a polyethylene-vinyl acetate copolymer, it was determined that the measured vinyl acetate percentage ranged from a low of 24% to a high of 31% over a 36 hour period. With the apparatus utilized in the practice of the present invention, variations of the percentage of vinyl acetate in a copolymer from a predetermined amount can be very easily discovered, and the necessary adjustments to stabilize its proportion can be easily made.

It should be noted in this respect, however, that the accuracy of the measurements made are somewhat affected by variations in temperature and by variations in pressure. It is for that reason that the capacitance probe 19 of FIG. 1 is preferably located in the grader unit of the fluid plastic forming apparatus where, as is conventional, temperature and pressure are closely maintained and the polymerization reaction is essentially complete. Clearly, however, the probe can be placed at any point in the process where temperature and, to some extent, pressure, is reasonably controlled, or can be controlled by auxiliary means and the state of the final product remains substantially constant.

Referring now to FIG. 2, there is shown another embodiment of apparatus which may be employed to carry out the process of the invention. Housing 30 is constructed from a ¾ inch by 2½ inch nipple having ½ inch couplings 31 welded onto opposing sides thereof. Connecting rods 32 go through couplings 31 into housing 30 through openings 33. Rods 32 are insulated from housing 30 by spacer seals 34, and can be enclosed within couplings 35 within couplings 31. Rods 32 are connected at threaded holes 37 to rectangular capacitance plates 36 which are spaced parallel to each other within housing 30 a predetermined distance (e.g., 0.125 inch) apart. The rectangular capacitance plates 36 can be stainless steel plates measuring 0.125 inch thick, 0.50 inch wide, and 2.5 inches long.

Connecting rods 32 are connected at ends 38 to the two leads 39 and 40 of a shielded or coaxial cable. The coaxial cable is then connected to a capacitance meter (not shown) or equivalent instrument as explained in connection with the apparatus shown in FIG. 1.

Housing 30 can be installed in the sample line of a continuous grader unit in an apparatus for producing ethylene-vinyl acetate copolymer. The direction of flow through the continuous grader is indicated in FIG. 2. Rods 32 and leads 39 and 40 are enclosed within tubing or pipe (not shown) to protect them from the environment. The capacitance of the copolymer flowing through housing 30 is measured between plates 36. It is preferable to coat the inner surface of housing 30 with poly(tetrafluoroethylene) or a similar material to facilitate the flow of the copolymer through housing 30.

The apparatus described can be employed in combination with process control means to continuously control the proportion of monomer feed in a process for producing copolymers. The apparatus of the invention senses changes in the composition of the copolymer, and an indication of this change can be signaled to process control means to make appropriate adjustments in the proportion of the monomer feed.

The process of the invention is carried out by utilizing the apparatus described above. As is apparent from the foregoing discussion, the process comprises a method for determining the proportion of monomers in a copolymer, said monomers having different dielectric constants. The process comprises measuring the capacitance of a capacitive detector while in contact with a fluid stream of copolymer in a zone of relatively constant temperature and pressure, and comparing the capacitance so measured with a predetermined reference value.

The predetermined reference values can be determined by various methods. One such method consists of preparing samples of a fluid copolymer having known proportions of monomers, maintaining conditions of temperature and pressure similar to that which will be utilized when measuring capacitance of the capacitive detector while in contact with the same kind of fluid copolymer containing an unknown proportion of monomers, measuring the capacitance of the capacitive detector while in contact with the various samples of fluid copolymer, recording the capacitance values obtained for each sample tested and correlating the values to known percentages of monomers in the samples.

Having determined the reference values for any copolymer, it is a relatively simple matter to determine the percentage or proportion of monomers in the copolymer. As illustrated in FIG. 3, the percentage of vinyl acetate in polyethylene-vinyl acetate copolymer can be determined by contacting as described hereinbefore the capacitive detector with the fluid polyethylene-vinyl acetate copolymer, measuring the capacitance and comparing the capacitance with the predetermined reference values.

What we claim is:

1. A process for determining the proportion of monomers in a copolymer, wherein the monomers have different dielectric constants, said process comprising contacting a capacitive detector responsive to the dielectric constant of fluids with a fluid stream of said copolymer in a zone of relatively constant temperature and pressure, measuring the capacitance of the capacitive detector while in contact with the fluid stream and comparing the value of the capacitance so measured with a predetermined reference value.

2. A process according to claim 1, wherein the copolymer is a copolymer of (a) styrene or an alkene of from 2 to 4 carbon atoms, and (b) an alkenoic acid, an alkyl ester of an alkenoic acid, or a vinyl ester of an alkanoic acid.

3. A process according to claim 2, wherein the copolymer is an ethylene-vinyl acetate copolymer.

4. In a method for the production of a copolymer composed of monomers having different dielectric constants, the improvement comprising controlling the proportion of the monomers in the copolymer by continuously detecting variations from a predetermined reference value of the capacitance of a fluid stream of said copolymer in a zone of relatively constant temperature and pressure, transmitting the variations to controlling means for controlling the proportion of monomer feed in the method, and responding to the variations by adjusting the proportion of monomer feed such that the capacitance is caused to become closer to the value of the reference value.

References Cited

UNITED STATES PATENTS

| | | | |
|---|---|---|---|
| 3,478,589 | 11/1969 | Birken | 324—61 R X |
| 3,506,640 | 4/1970 | Reid et al. | 23—230 A X |
| 3,546,926 | 12/1970 | Dunavent, Jr. | 324—61 R X |

OTHER REFERENCES

Hallett, L. T.: Anal. Chem., *14*, No. 12, 968–969 (1942).

Steingiser et al.: Anal. Chem., *31*, No. 7, 1261–1265 (1959).

ROBERT M. REESE, Primary Examiner

U.S. Cl. X.R.

23—253 A; 260—88.1 PC, 95 A; 324—61 R